United States Patent [19]
Akkermans

[11] Patent Number: 5,793,721
[45] Date of Patent: Aug. 11, 1998

[54] OPTICAL SCANNING APPARATUS FOR A MULTI-LAYER RECORD CARRIER, INCLUDING A FOCUS CONTROL CIRCUIT

[75] Inventor: Antonius H. M. Akkermans. Eindhoven. Netherlands

[73] Assignee: U.S. Philips Corporation. New York. N.Y.

[21] Appl. No.: 688,461

[22] Filed: Jul. 30, 1996

[30] Foreign Application Priority Data

Jul. 31, 1995 [EP] European Pat. Off. ............ 95202084

[51] Int. Cl.$^6$ .................................................... G11B 7/00
[52] U.S. Cl. ............................ 369/44.27; 369/44.29; 369/94
[58] Field of Search ...................... 369/48, 32, 94, 369/275.3, 44.25, 58, 44.27, 112, 44.29

[56] References Cited

U.S. PATENT DOCUMENTS

| | | | |
|---|---|---|---|
| 4,023,033 | 5/1977 | Bricot et al. | 250/201 |
| 4,724,533 | 2/1988 | Ohara et al. | 369/32 |
| 5,189,293 | 2/1993 | Leenknegt | 250/201.5 |
| 5,263,011 | 11/1993 | Maeda et al. | 369/94 |
| 5,321,676 | 6/1994 | Van Velthoven et al. | 369/32 |
| 5,511,057 | 4/1996 | Holtslag et al. | 369/94 |
| 5,608,715 | 3/1997 | Yokogawa et al. | 369/94 |

FOREIGN PATENT DOCUMENTS

| | | |
|---|---|---|
| 0020199 | 12/1980 | European Pat. Off. |
| 0020199B1 | 12/1980 | European Pat. Off. |
| 0517490 | 12/1992 | European Pat. Off. |
| 0583036A2 | 2/1994 | European Pat. Off. |
| 0717401 | 6/1996 | European Pat. Off. |

*Primary Examiner*—Nabil Hindi
*Attorney, Agent, or Firm*—Michael E. Belk

[57] ABSTRACT

An optical beam in a scanning device is focused on an information layer of a multi-layer optical record carrier. A focus control circuit keeps the focal point of the beam on the information layer. When the focal point jumps to another information layer, the focus control circuit does not monitor the so-called central aperture signal in order not to depend on the presence of information in the information layers. During the jump the characteristics of the feedback loop of the focus control unit are modified to avoid instabilities in the movement of the focal point during the jump. The characteristics of the feedback loop are restored after a predetermined period of time. then the focal point is near the designated layer and the restored control loop focuses the focal point on the designated layer.

20 Claims, 4 Drawing Sheets

OPTICAL SCANNING APPARATUS FOR A MULTI-LAYER RECORD CARRIER, INCLUDING A FOCUS CONTROL CIRCUIT

BACKGROUND OF THE INVENTION

This invention relates to an optical scanning apparatus for scanning an optical record carrier having at least a first and second superjacent information layers, comprising an optical system including means for focusing a radiation beam to a focal point, focus actuator means for controlling the focusing means to shift the focal point in a direction perpendicular to the layers, a focus error detector for deriving a focus error (FE) signal indicative of the direction and distance between the focal point and the layer to be scanned, a focus control circuit for deriving a focus actuator drive signal (FA) in response to the FE signal and supplying said drive signal to the focus actuator to cause the actuator to maintain the focal point substantially on the layer to be scanned, a first controller for generating a binary loop-control signal which assumes a first logical value controlling a modification of the functionality of the focus control circuit after receiving a layer-jump command for changing the scanning from the first to the second layer and a second logical value controlling the restoring of the functionality.

An optical record carrier may comprise several information layers to increase its storage capacity. Each of these layers may be scanned one at a time by a single optical beam which is brought to a focal point by means of an objective lens. A focus control circuit keeps the focal point on an information layer, the circuit controlling the position of the objective lens in response to a focus error signal, which represents the deviation of the focal point from the information layer. The focus error signal is derived from the radiation reflected or transmitted from the record carrier and intercepted by a photo-detection system. The radiation from the record carrier is also used to generate a so-called central aperture (CA) signal, which is a measure for the total amount of radiation reflected by the record carrier. The CA signal may be used to form an information signal representing the information read from the record carrier.

When a scanning apparatus starts a scanning session, it must move the objective lens towards the record carrier. During this movement, the focal point crosses the so-called entrance plane of the record carrier, a low-reflection boundary surface of a substrate of the record carrier through which the information layers are scanned. In order to avoid lock on of the focal point to the entrance plane, the focal control circuit checks the amplitude of the CA signal. When the amplitude due to the entrance plane is below a certain level, the circuit will not lock the focal point on the entrance plane, and will continue moving the objective lens towards the record carrier. When the focal point approaches the information layer of the record carrier, the high reflection of this layer will cause the CA signal to cross said level, and the focus control circuit will lock the focal point on the information layer.

The European patent application nr. 0 020 199 discloses a scanning apparatus comprising a focus control circuit for changing the focal point between two information layers of an optical record carrier. When changing to another information layer, the feedback loop of the focus control circuit is opened, the actuator is driven in the appropriate direction, and the level of the high-frequency content of the CA signal is monitored. When the amplitude of the high-frequency content crosses a certain level, the focal point is close to the information layer, and the feedback loop is closed. The focus control circuit then takes care that the focal point follows the information layer.

A disadvantage of the known scanning apparatus is that changing the focal point between layers does not operate anymore if one or both layers have not (yet) been provided with information. Such a situation arises in multilayer recording systems. Since in that case the CA signal does not comprise the high-frequency content, said level will not be crossed and the feedback loop will not be closed.

SUMMARY OF THE INVENTION

It is an object of the invention to provide an optical scanning apparatus that can reliably focus on all information layers of an optical record carrier, whether the layers contain any information or not.

The scanning apparatus according to the invention is thereto characterized in that the optical scanning apparatus comprises pulse generating means for generating a jump control pulse for activation of the focus actuator means upon receiving said layer jump command by said pulse generating means, which layer jump command further causes a substantial modification of the functionality of the focus control circuit at least during the time period of the jump control pulse and a restoration of the functionality of the focus control circuit upon the lapse of said time period.

Another embodiment of the optical scanning apparatus in accordance with the invention is characterized in that the substantial modification lasts for a predetermined time period, which is substantially longer than the time period of the jump control pulse. In this embodiment the motion of the actuator during the jump is caused by the jump control pulse and subsequent to the jump control pulse the actuator travels with constant speed and independent of the focus error signal (FE) so as to bring the focal point close to the layer to be scanned. Knowing the distance between the layers e.g. 25 µm and giving the jump control pulse a proper power, the speed at which the actuator will travel while the focus control circuit is inactive, the predetermined time period during which the focus servo control should be inactive can easily be determined. Subsequently the functionality of the focus control circuit is restored and the focal point will be forced to the layer to be scanned.

When using only the FE signal, a special precaution must then be taken when moving the focal point from one layer to the other. If the feedback loop of the focus control circuit were to be kept closed when changing to another information layer, the actuator would acquire too much speed around the zero-crossing of the FE signal situated in between two information layers. As a consequence, the actuator might shoot beyond the designated information layer. The apparatus according to the invention solves the problem by opening the feedback loop or part of it in an interval around said zero-crossing, thereby avoiding the undue speed increase.

An important contribution to the speed increase comes from the differentiating branch in the feedback loop due to the slope of the FE signal around said zero-crossing. The part of the feedback loop to be opened is therefor preferentially the differentiating branch. The other two branches of the feedback loop, i.e. the proportional and integrating branch, can, to a certain extent, control the speed of the actuator during the jump in response to the motion of the record carrier.

A preferred embodiment of the scanning apparatus according to the invention is characterized in that the substantial modification is realized by interruption of an input signal at the input of the focus control circuit.

BRIEF DESCRIPTION OF THE DRAWINGS

These and other aspects of the invention will be apparent from and elucidated with reference to the embodiments described hereinafter in conjunction with the following drawings, in which.

Identical reference numerals in the different Figures denote identical elements.

DESCRIPTION OF THE PREFERRED EMBODIMENTS

Figure 1:
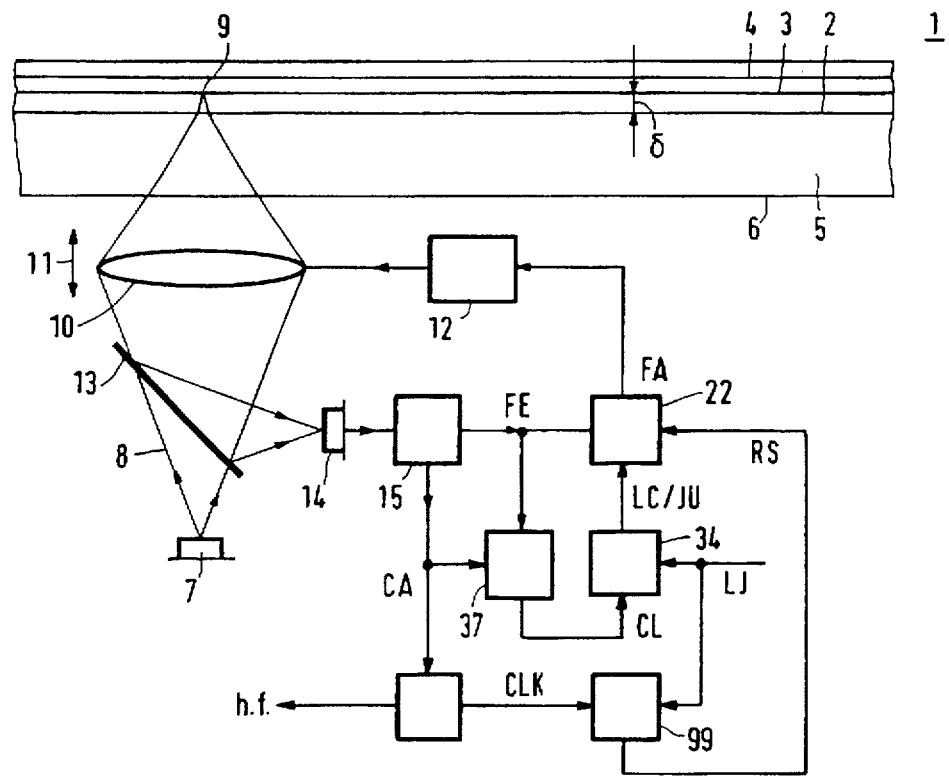
FIG. 1 shows schematically a scanning device according to the invention.

FIG. 1 shows an optical scanning apparatus according to the invention for scanning an optical record carrier 1. The figure shows a cross-section of the record carrier, which has three superjacent information layers 2, 3, 4 each spaced by a distance δ. Each of the layers may be scanned separately through a transparent substrate 5, which has an entrance surface 6 forming a boundary between the environment and the record carrier. Information layers 2 and 3 are partially reflective in order to make the scanning of information layer 4 possible through layers 2 and 3. The information may be encoded in the information layers in the form of pits, bumps, areas having a reflection or magnetization different from the surrounding area. The record carrier may be disc shaped, rotatable around its centre or of rectangular shape.

The scanning apparatus has an optical system for generating an optical beam used for scanning the record carrier. The optical system comprises a radiation source 7, for instance a semiconductor laser, forming a radiation beam 8. The radiation beam is converted to a focal point by a focusing means 10, for instance a single- or multi-element objective lens. The objective lens may be moved along its optical axis, the z-axis i.e. in the directions of arrow 11, by means of a focus actuator 12. The focus actuator may be a linear motor in the form of a magnet in a magnetic coil or magnetic coil within one or more magnets. The motion of the objective lens can shift focal point 9 through the information layers. Radiation reflected by record carrier 1 is converged by objective lens 10 via a beam separator 13 onto a detection system 14. The beam separator may be a normal beam splitter, a polarizing beam splitter or a grating. Detection system 14 comprises in general several radiation sensitive detection elements. The electrical output signals of the elements are fed into a signal forming circuit 15. The circuit forms the sum of the electrical signals, which is output as the central aperture (CA) signal. The CA signal is a measure for the total amount of radiation reflected by record carrier 1. The high frequency content (h.f.) of the CA signal represents information encoded in the information layers and is used by circuit 15B to regenerate a clock signal clk from the CA signal.

Signal forming circuit 15 forms a radial error signal from the output signals of the detection system, which represents the distance between the centre of the focal point and the centre of a track to be followed on an information layer. A radial control system for keeping the focal point on the track is known from, inter alia, U.S. Pat. No. 5,321,676, and is not elaborated nor shown in the Figures.

Signal forming circuit 15 also forms such a combination of the electrical output signals of detection system 14 as to obtain a focus error (FE) signal. The value of the FE signal represent the direction and magnitude of the deviation of the focal point from the information layer being scanned. The way of combining the electrical signals, the lay-out of the detection elements and the form of beam separator 13 depends on the method used for forming the FE signal. Possible methods are the so-called astigmatic method, the Foucault method and the beam-size method, known from inter alia U.S. Pat. No. 4,023,033, European patent application No. 0 583 036 and U.S. Pat. No. 4,724,533 respectively.

Figure 2:
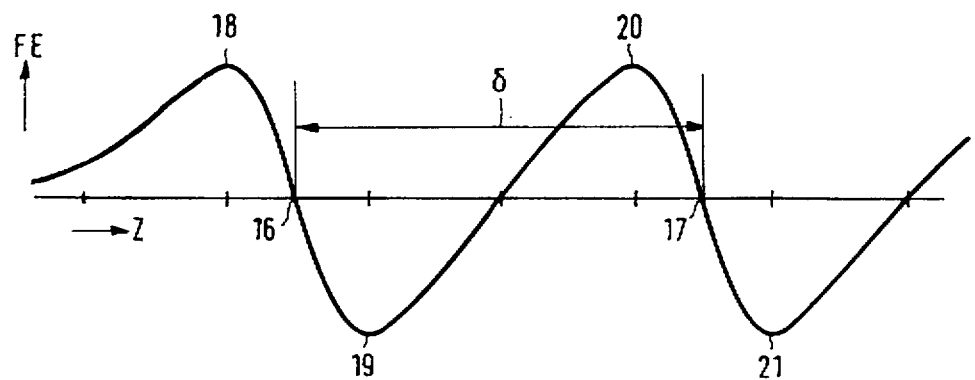
FIG. 2 shows the form of the focus error signal as a function of the position of the focal point.

FIG. 2 shows the form of the FE signal as a function of the displacement of the focal point in the z-direction, i.e. in a direction along the optical axis of objective lens 10, for two crossings of information planes. The FE signal is substantially zero at positions 16 and 17 spaced by δ, where the focal point coincides with information layer 2 and 3 respectively. The FE signal has a positive maximum 18, 20 and a negative maximum 19, 21 on both sides of each zero-crossing 16 and 17.

Figure 3:
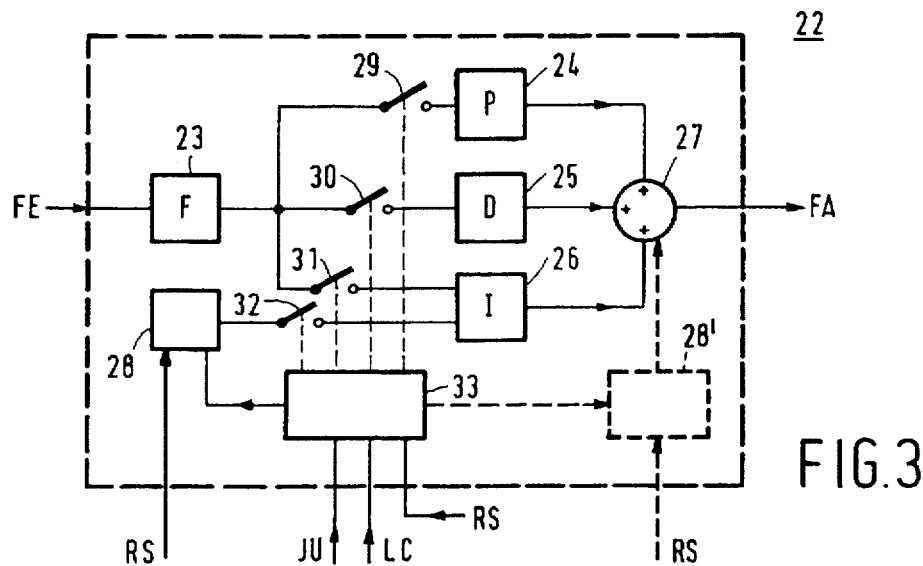
FIG. 3 shows schematically the focus control circuit.

In FIG. 1 the FE signal is input to a focus control circuit 22 for deriving a focus actuator (FA) signal in response to the FE signal and supplying said drive signal to focus actuator means 12 to cause the actuator to maintain focal point 9 substantially on the information layer to be scanned. FIG. 3 shows schematically the lay-out of focus control circuit 22. The FE signal is input in a filter circuit 23, comprising a cross-over filter and an amplifier. The output signal of the filter circuit is used as input for the circuits. The first circuit is a linear amplifier 24 for obtaining a proportional focus control action. The second circuit is a differentiator 25 for obtaining a differentiating focus control action. The third circuit is an integrator 26 for obtaining an integrating focus control action. The output signals of the three circuits are combined in an adder circuit 27 to produce the FA signal for focus actuator 12. Integrator 26 has an additional input signal from a pulse generating means 28. This circuit 28 can generate a constant pulse signal, which is called the jump control pulse and when input on the integrator causes the FA signal level to increase in the form of a ramp. The inputs of linear amplifier 24 and differentiator 25 and the two inputs of the integrator 26 can be interrupted by switches 29, 30, 31 and 32 respectively, arranged in the signal paths to the inputs. The switches are controlled by a loop controller 33 in dependence on a loop control (LC) signal. The LC signal may comprise a series of signal transmitted in parallel. The opening and closing of the switches modifies the characteristics of focus control circuit 22. The actual operation of the control will be explained below. Integrator 26 is preferably switched on and off at its one or more inputs instead of at its output. Switching at the output entails removing or addition to the FA signal the output of the integrator, which may have a significant level, thereby disturbing the focus control. The embodiment of control circuit 22 shown in FIG. 3 controls the motion of the focus actuator during the layer jump by means of the regularly increasing output level of integrator 26. In an alternative embodiment the motion of the focus actuator is determined by either a positive or negative jump control pulse supplied to adder circuit 27 by a jump control pulse generating circuit 28', after which the actuator moves either upward or downward without further powering. The pulse may, for example, have a duration of 1 ms, after which the actuator continues to move a predetermined time period of 2 ms, giving a total time of about 3 ms to move the focal point from one layer to another layer over a distance of 25 μm.

The combination of detection system 14, signal forming circuit 15, focus control circuit 22, focus actuator 12 and focusing means 10 forms a feedback loop for keeping focal point 9 on an information layer to be scanned. Linear amplifier 24, differentiator 25 and integrator 26 form three branches of the feedback loop.

Figure 4:
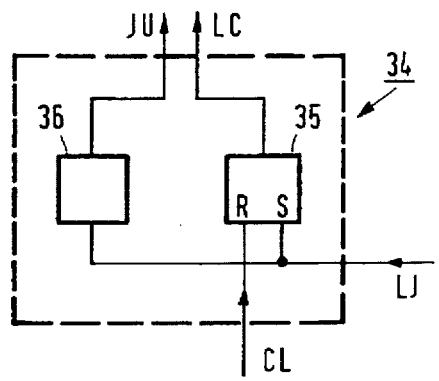
FIG. 4 shows an embodiment of the first controller.

The binary LC signal in FIG. 1 is generated by a first controller 34. FIG. 4 shows an embodiment of the controller. The LC signal assumes a first logical value after receiving a layer-jump (LJ) command for changing the scanning from one information layer to another one. The LC signal assumes a second logical value after receiving a transition in a binary close (CL) signal. The LC signal modifies the characteristics of the feedback loop via loop controller 33 the moment the command is received to change information layers. The signal restores the characteristics of the feedback loop when a transition in the CL signal is detected and the focal point is close to the information layer where the scanning is to be continued. A circuit 35, possibly a set-reset flip-flop, modifies the LJ signal and CL signal into the LC signal.

First controller 34 also comprises a jump control signal generator 36 for supplying a jump (JU) signal which is a delayed jump command to the focus control circuit in synchronism with the LC signal for making focal point 9 move in the direction of the information layer to be scanned. On receipt of the LJ command, the generator outputs the JU signal to the focus control circuit 22. This signal closes switch 32 of the focus control circuit and triggers the pulse generator circuit 28, upon which circuit 28 sends a constant level signal of positive or negative polarity to integrator 26, causing the focus actuator to move over a distance and in a direction indicated by the constant level signal and determined by the number of information layers to jump and the direction of the jump.

The CL signal used as input for first controller 34 is generated by a counter 99 in response to the jump command signal LJ. The counter 99 counts a predetermined amount of clock pulses clk and generates after a predetermined time period a reset signal RS, which is supplied to the pulse generator circuit 28 (or 28') and to the loop controller 33 so as to restore the functionality of the focus servo control circuit 22.

Figure 5:
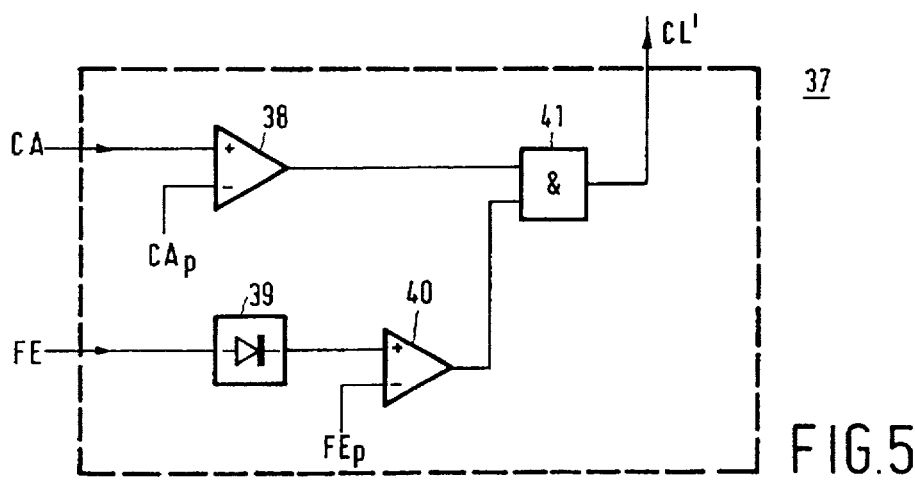
FIG. 5 shows an embodiment of a second controller.

The signal CA is used when the focal point is moved through the entrance face towards the information layers. When changing the focal point between information layers, the CA signal need not be used anymore. FIG. 5 shows an embodiment of a second controller. The CA signal or a low-pass filtered CA signal is input to a comparator 38, which gives a binary '1' output signal when the CA signal exceeds a predetermined CA preset value CAp. The value of CAp is set such that it is higher than the CA signal due to entrance face 6 and lower than the CA signal due to an information layer. The FE signal is rectified in a rectifier 39. A comparator 40 compares the output of rectifier 39 with a predetermined FE preset value FEp. The value of FEp is set such that it is higher than the peak value of the noise in the FE signal and smaller than the maximum value of the S-curve. The outputs of comparators 38 and 40 are combined in an AND circuit 41, which gives a binary '1' output signal only if both its inputs are '1'. The output of AND circuit 41 is connected to the CL-signal conductor. The CL-signal conductor connects the CL signal to first controller 34.

The operation of the control circuits will now be described with reference to the circuit diagrams in FIGS. 1, 3, 4 and 5 and the diagrams in FIGS. 2 and 6.

At the start of a scanning session, a layer-jump (LJ) command is given to first controller 34, which causes jump control signal generator 36 to send a jump pulse to focus control circuit 22. The subsequent closing of switch 32 and activation of circuit 28 causes the focus actuator (FA) signal to ramp up or down, depending on the sign of the signal generated by circuit 28. Circuit 35 will output an LC signal, opening switches 29, 30 and 31, thereby opening the feedback loop, of which focus control circuit 22 forms a part. The values of the FE and CA signals during the ramp are shown in FIG. 6 as a function of the displacement z along the optical axis of the objective lens 10. Second controller 37 monitors these values and acts when both signals cross the appropriate preset values. The FE signal around position 45 of the entrance surface is equally large as the FE signal around the positions 46, 47 and 48 of information layers 2, 3 and 4 respectively, because signal forming circuit 15 normalizes the FE signal, making it independent of the reflectivity of a surface or layer. Since the FE signal of the entrance surface crosses the FEp level, comparator 40 will output a '1' signal. However, the not-normalized CA signal remains below the CAp level because of the low reflectivity of the entrance surface. Comparator 38 will not output a '1' signal, and, since switch 44 connect the CL signal to the output of AND circuit 41, no transition in the CL signal is generated. Hence, the feedback loop remains open, and the ramp continues. When the focal point passes position 46', where the focal spot approaches information layer 2, the CA signal crosses the CAp level and, somewhat later, the FE signal crosses the FEp level at position 49, AND circuit 41 will then output a '1' signal. The output of AND circuit 41 will supply a CL' signal to the CL conductor during the start phase of a scanning session, the CL' signal is transmitted to first controller 34, where it resets circuit 35. The value of the LC signal drops to '0', closing switches 29, 30 and 31, thereby closing the feedback loop. At the same time switch 32 is opened by circuit 33, terminating the ramp. Focus control circuit 22 will now control the position of focal point 9 such that it moves from position 49 to 46, where it stays locked. A more detailed description of the initial focusing step may be found in U.S. Pat. No. 5,189,293.

Figure 6:
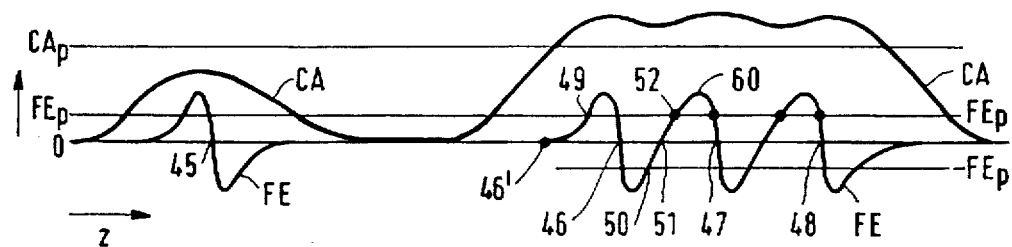
FIG. 6 shows the form of the focus error signal and the central aperture signal as a function of the position of the focal point.

When, during a scanning session the focal point must jump layers, for instance from information layer 2 to information layer 3, i.e. from position 46 to position 47 in FIG. 6, the above described, known method used for initial focusing cannot be used. If the known method were to be applied, level crossings of both the CA and FE signals would be monitored. Since the comparator checks the absolute value of the FE signal, comparator 40 will detect an upward crossing at position 50. The CA signals of the information layers overlap to such an extent, that the CA signal remains above the CAp preset level during layer jumps. Hence, comparator 38 will also output a '1' signal, causing AND circuit 41 to output a '1' signal. In the known method the output of AND circuit 41 is connected with the CL conductor, so that the signal CL' is set to '1', keeping the feedback loop closed. In case the actuator does not move sufficiently fast at position 50, the focus control will pull the focal point back to position 4. In case the actuator moves fast enough, the focal point will continue to move in the direction of position 47. However, around the zero-crossing of the FE signal at position 51, where the focal point is half way the distance between layers 2 and 3, the actuator will acquire a high speed due to the effect of the positive slope of the FE signal on the differentiator of focus control circuit 22. The high speed makes capture of the focal point at position 47 uncertain.

Figure 8:
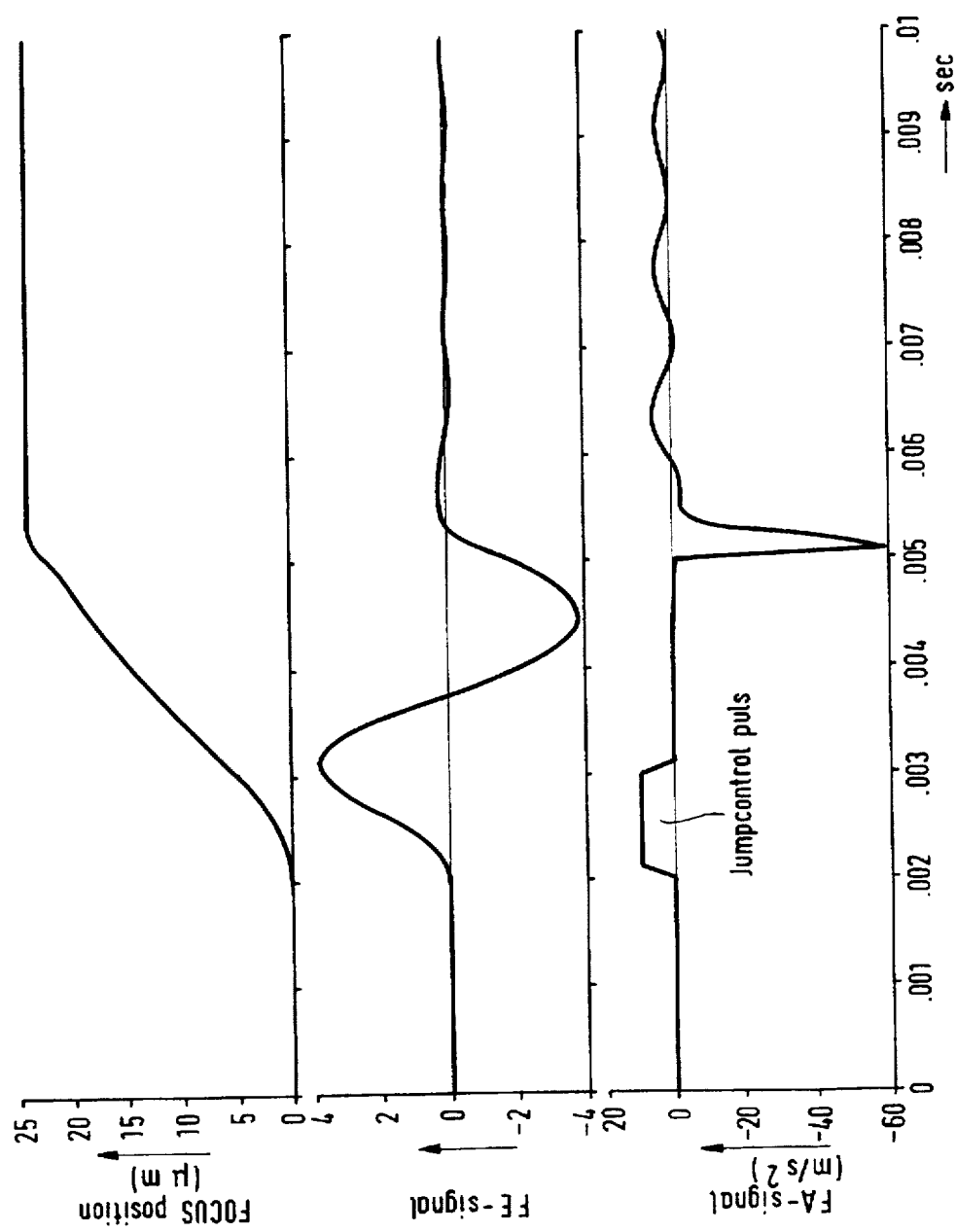
FIG. 8 shows a time diagram of the focus position, the focus error signal and the focus attenuator signal in a device in accordance with the invention.

The focus control according to the invention solves this problem by a very efficient solution. Upon receiving the layer jump command LJ by the first controller 34 (FIG. 4) while the loop control signal LC supplied by the counter 99 is "1" then the LC signal and the JU signal are generated, which via circuit 33: i) open the switches 29, 39 and 31; ii) close switch 32 and causes a jump control pulse generated by jump control pulse generating means 28 to appear on the second input of integrator 26. Said jump control pulse forces the focal point to move from the scanned layer to the next layer to be scanned. After termination of the jump pulse the actuator means are still forced onwards by the output of integrator 26 until counter 99 reaches it final count number, thereby generating the reset signal RS. Via circuit 33 the reset signal RS causes the switches 29, 30 and 31 to be closed and the switch 32 to be opened. Further, the pulse generating circuit 28 is reset so that this circuit 28 may generate another pulse upon receipt of a proper trigger via circuit 33. The pulse generating circuit 28 may comprise a monostable Flip Flop. Alternatively and preferably, a pulse generating circuit 28' may be used instead of circuit 28 (also switch 32 can be dispensed with). The circuit 28' supplies a jump control pulse to the output of the control circuit 22 in the time period 2 msec.–3 msec. (see FIG. 8; FA signal). As a result the focus actuator means 12 forces the focus means into an accelerating movement during supply of said focus control pulse. Upon termination of said jump control pulse the focus means follow a ramp curve meaning that the focus means travel with constant speed (as shown in FIG. 8; focus position). After a fixed time period (5 msec.) the control circuit 22 is rendered active again by reset signal RS. Then the focus control circuit generates the proper FA signal to focus the focal spot on the designated layer (FIG. 8; FA signal after 5 msec.). Further the actual FE signal is shown in FIG. 8 as a function of time. In this example the switches 29, 30, 31 and 32 open or close the connections between amplifier 23 or circuit 28 and the P.I.D. circuit 24, 25 and 26. In this respect opening of said switches is meant to be equivalent to putting either the inputs of the P.I.D. circuits 24, 25, 26 to ground or the outputs of circuits 23 and 28 to ground or the input of circuit 23 and output of circuit 28 to ground.

Of course, if in a multilayer disc a jump has to be made from one layer to another, which may be the third or fourth layer and thus a distance of e.g. 50 or 75 μm is to be travelled, the counter 99 should be set to count a larger number so as to elongate the time period that the actuator is drifting free. Referring to FIG. 8, the time period could take about 5 msec. and 8 msec. to travel about 47.5 μm respectively 73 μm before the focus control circuit is switched on again.

Further, the pulse amplitude of the jump control pulse might be increased so as to have relatively shorter jump cycles between layers that are not directly superjacent.

Figure 7:
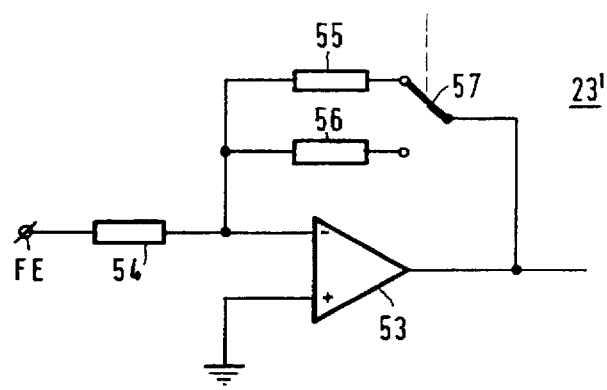
FIG. 7 shows an adjustable differentiator.

In another embodiment of the optical scanning device according to the invention, the modification of the feedback loop around zero-crossing 51 comprises a change in the amplifier of the feedback loop. FIG. 7 shows the diagram of an adjustable amplifier 23', which receives the focus error signal FE on its output. The input signal FE of the amplifier is connected to a first input of an operational amplifier 53 via a resistor 54. The second input of the operational amplifier is connected to ground. Two resistors 55 and 56 are connected to the first input. A switch 57 connects either resistor 55 or resistor 56 to the output. Different values of the resistor provide different amplification factors. The switch is operated via circuit 33. When the focus is locked on an information layer, the switch will be in such a position that a maximum amplifying action is obtained. During a focus jump, the switch will be in such a position that a small amplification is obtained, thereby avoiding that the actuator acquires too much speed when crossing positions like 51. During initial focusing, the feedback loop may opened by switches 29, 30, 31 and 32 as described above.

Although the disclosure of the invention has been made with reference to a scanning device for scanning optical record carriers, a person skilled in the art will readily understand that the invention is not limited to such a device, but encompasses scanning devices for any kind of object having superjacent layers comprising some kind of information. An example is a scanning device for investigating superjacent layers of an integrated semiconductor circuit by radiation having a wavelength for which the layers are at least partly transparent. The device scans the different layers forming the circuit, while the information read from the layer is the structure of these layers.

I claim:

1. Optical scanning apparatus for scanning an optical record carrier having at least first and second superjacent information layers, comprising:

an optical system including means for focusing a radiation beam to a focal point, focus actuator means for controlling the focusing means to shift the focal point in a direction perpendicular to the information layers, a focus error detector for deriving a focus error (FE) signal indicative of the direction and distance between the focal point and the information layer to be scanned, a focus control circuit for deriving a focus actuator drive signal in response to the FE signal and supplying said drive signal to the focus actuator means to cause the focus actuator means to maintain the focal point substantially on the information layer to be scanned, a first controller for generating a binary loop-control signal which assumes a first logical value controlling a modification of the functionality of the focus control circuit after receiving a layer-jump command signal for changing the scanning from the first to the second information layer and a second logical value controlling the restoring of the functionality, and pulse generating means for generating for a time period a jump control pulse for activation of the focus actuator means upon receiving said layer jump command signal by said pulse generating means, and the layer jump command signal further causes a substantial modification of the functionality of the focus control circuit at least during the time period of the jump control pulse and a restoration of the functionality of the focus control circuit upon a lapse of said time period.

2. An optical scanning apparatus as claimed in claim 1, wherein the substantial modification lasts for a predetermined time period which is longer than the time period of the jump control pulse.

3. An optical scanning apparatus as claimed in claim 1, further comprising means for interrupting an input signal at the input of the focus control circuit so as to provide the substantial modification of the functionality of the focus control circuit.

4. An optical scanning apparatus as claimed in claim 1, wherein the substantial modification is realized by means for altering an amplification factor of the focus control circuit.

5. An optical scanning apparatus as claimed in claim 1, wherein the modification of the functionality is realized by means for interrupting an input signal at an input of a proportional branch and of a differentiating branch of a PID-controller of the focus control circuit and the pulse generating means supply a jump control pulse to an integrating branch of the PID-controller.

6. An optical scanning apparatus as claimed in claim 2, wherein the apparatus comprises at least three superjacent layers, wherein the predetermined time period is dependent on the number of layers to be jumped across.

7. An optical scanning apparatus as claimed in claim 3, wherein the pulse generating means add the jump control pulse to the focus actuator drive signal of the focus control circuit.

8. An optical scanning apparatus as claimed in claim 4, wherein the pulse generating means add the jump control pulse to the focus actuator drive signal of the focus control circuit.

9. An optical scanning apparatus as claimed in claim 2, further comprising means for interrupting an input signal at the input of the focus control circuit so as to provide the substantial modification of the functionality of the focus control circuit.

10. An optical scanning apparatus as claimed in claim 9, wherein the pulse generating means add the jump control pulse to the focus actuator drive signal of the focus control circuit.

11. An optical scanning apparatus as claimed in claim 2, wherein the substantial modification is realized by means for altering an amplification factor of the focus control circuit.

12. An optical scanning apparatus as claimed in claim 11, wherein the pulse generating means add the jump control pulse to the focus actuator drive signal of the focus control circuit.

13. An optical scanning apparatus as claimed in claim 2, wherein the modification of the functionality is realized by means for interrupting an input signal at an input of a proportional branch and of a differentiating branch of a PID-controller of the focus control circuit and the pulse generating means supply a jump control pulse to an integrating branch of the PID-controller.

14. An optical scanning apparatus as claimed in claim 1 wherein the focus actuator means, the focus error detector and the focus control circuit are part of a feedback control loop of the optical scanning apparatus, and the focus control circuit includes a PID controller having a differentiating branch, a proportional branch and an integrating branch, and means for interrupting the differentiating branch of the PID controller to cause the substantial modification of the functionality of the focus control circuit.

15. Optical scanning apparatus for an optical record carrier having first and second information layers, comprising:

an optical system including means for focusing a radiation beam to a focal point on the optical record carrier, focus actuator means for controlling the focusing means so a to shift the focal point in a direction perpendicular to the information layers, a focus error detector for deriving a focus error (FE) signal indicative of the direction and distance between the focal point and the information layer to be scanned, a focus control circuit for deriving a focus actuator drive signal in response to the focus error signal and supplying said drive signal to the focus actuator means to cause the focus actuator means to maintain the focal point substantially on the information layer to be scanned, wherein the focus actuator means and the focus control circuit are part of a feedback servo loop circuit which maintains the focal point on a selected information layer to be scanned, pulse generating means response to a layer jump command signal for generating a jump control pulse for activating the focus actuator means to move the focal point from one of said first and second information layers to the other one of said first and second information layers, and means response to the layer jump command signal for altering an operational characteristic of the feedback servo loop circuit at least during a time period coincident with the jump control pulse and for restoring said operational characteristic at a time subsequent to said time period.

16. The optical scanning apparatus as claimed in claim 15 further comprising means for maintaining the alteration of the operational characteristic for a predetermined time period which is longer than the time period of the jump control pulse.

17. The optical scanning apparatus as claimed in claim 15 wherein the means for altering an operational characteristic alters an operational characteristic of the focus control circuit such that the focus actuator means shifts the focal point between information layers independently of the focus error signal.

18. The optical scanning apparatus as claimed in claim 15 wherein the focus control circuit comprises a PID-controller including a proportional branch, an integration branch, a differentiating branch and a switch for opening and closing the differentiating branch, and wherein the means for altering an operational characteristic opens said switch to interrupt the differentiating branch in response to the layer jump command signal.

19. The optical scanning apparatus as claimed in claim 18 wherein the pulse generating means supply the jump control pulse to the integrating branch of the PID-controller via a second switch controlled by said means for altering the operational characteristic of the feedback servo loop circuit.

20. The optical scanning apparatus as claimed in claim 15 wherein the means for altering the operational characteristic includes means for interrupting an input signal to the focus control circuit.

* * * * *